(12) United States Patent
Nevidomski et al.

(10) Patent No.: US 7,809,744 B2
(45) Date of Patent: Oct. 5, 2010

(54) METHOD AND SYSTEM FOR APPROXIMATE STRING MATCHING

(75) Inventors: Alexei Nevidomski, Swords (IE); Pavel Volkov, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 884 days.

(21) Appl. No.: 11/154,120

(22) Filed: Jun. 16, 2005

(65) Prior Publication Data

US 2006/0004744 A1    Jan. 5, 2006

(30) Foreign Application Priority Data

Jun. 19, 2004    (GB) .................. 0413743.6

(51) Int. Cl.
*G06F 17/30* (2006.01)
(52) U.S. Cl. ...................... 707/759; 707/797
(58) Field of Classification Search ............... 707/1–10, 707/100, 102, 759, 797
See application file for complete search history.

(56) References Cited

U.S. PATENT DOCUMENTS

| | | | | |
|---|---|---|---|---|
| 4,672,571 A | 6/1987 | Bass et al. | .................. | 364/900 |
| 4,701,851 A | 10/1987 | Bass et al. | .................. | 364/419 |
| 4,777,617 A | 10/1988 | Frisch et al. | .................. | 364/900 |
| 6,018,736 A * | 1/2000 | Gilai et al. | .................. | 707/6 |
| 6,026,398 A * | 2/2000 | Brown et al. | .................. | 707/5 |
| 6,424,983 B1 | 7/2002 | Schabes et al. | ............. | 707/533 |
| 6,616,704 B1 | 9/2003 | Birman et al. | .............. | 715/533 |

(Continued)

FOREIGN PATENT DOCUMENTS

WO    WO92/14293    7/2002

OTHER PUBLICATIONS

IEEE Transactions on Knowledge and Data Engineering Aug. 1996 (vol. 8, No. 4) pp. 540-547 H. Shang, T.H. Merrettal, Tries for Approximate String Matching.

(Continued)

*Primary Examiner*—Mohammad Ali
*Assistant Examiner*—Huawen Peng
(74) *Attorney, Agent, or Firm*—David A. Dagg

(57) ABSTRACT

Approximate string matching of a target string to a trie data structure. The trie data structure has a root node and generations of child nodes each node representing at least one character in an alphabet to provide a lexicon of words and word fragments. The trie data structure is traversed starting from the root node by comparing each node of a branch of the trie data structure to characters in the target string and adding characters traversed in a branch of the trie data structure to a gathered string to provide suggestions of approximate matches. If a node is reached that is flagged as a node for a word or a word fragment and, if the target string is longer than the gathered string, the traversal loops back to the root node, and continues to traverse from the root node. This enables the trie data structure to use word fragments for compound words and to split non-delimited words where appropriate. A determination may be made, at each node, as to whether there is a correction rule for one or more characters in the remainder of the target string from the current node, and if so, the correction rule is applied to the target string to obtain a modified target string.

15 Claims, 6 Drawing Sheets

U.S. PATENT DOCUMENTS

| | | | |
|---|---|---|---|
| 6,662,180 B1 * | 12/2003 | Aref et al. | 707/6 |
| 7,010,522 B1 * | 3/2006 | Jagadish et al. | 707/3 |
| 7,287,026 B2 * | 10/2007 | Oommen | 707/6 |
| 2003/0195836 A1 | 10/2003 | Hayes et al. | 705/37 |

OTHER PUBLICATIONS

Proceedings of the International Symposium on Cooperative Database Systems for Advanced Applications, Kyoto, 1996. World Scientific, 1996. T. H. Merrett, Heping Shang, Xiaoyan Zhao: Database Structures, Based on Tries, for Text, Spatial, and General Data. pp. 507-515.

R.C. Angell, G.E. Freund, and P. Willett. Automatic spelling correction using a trigram similarity measure. Information Processing and Management, 19:255-261, 1983.

IBM Research Disclosure Aug. 2002 Glushnev, N.I. Troussov, A.L. Volkov, P.V. Method and Apparatus for Performing Decomposition of an Input String Into the Concatenation of Non-Overlapping Non-Gapped Words or Word Formation Elements From Large Electronic Dictionary.

* cited by examiner

METHOD AND SYSTEM FOR APPROXIMATE STRING MATCHING

CROSS REFERENCE TO RELATED APPLICATIONS

The present application claims priority under 35 USC 119 to United Kingdom Application Number 0413743.6, filed Jun. 19, 2004.

FIELD OF THE INVENTION

This invention relates to the field of approximate string matching in a computer system. In particular, the invention relates to approximate matching of strings of characters with words and parts of words in a trie-based dictionary.

BACKGROUND OF THE INVENTION

Approximate matching for a string of characters has applications in many areas. One area is spell-checking applications which locate words which are closely similar to a series of letters found in a text. Suggestions of correct spelling in a chosen language are found and displayed for a user to choose from. Another application of approximate searching is searching for a query correction in a search engine. Also, approximate matching for a string of characters may be used in a non-language based application, for example, close matches in a database may be required. Some of the known methods of approximate string matching are described below.

Linear searches can be carried out in which the target string is compared to each dictionary entry. Edit distance, n-grams, or other criteria can be used to reject candidates. This has the disadvantage that it is a very slow method of searching.

Partial enumeration using a hash function is another method. A special hash function is used which is invariant for certain types of mistakes. For example, the "soundex" function used by Oracle Corporation returns a phonetic representation of a string. This method inherits common drawbacks of hashing in which the quality depends on the function used, its performance may deteriorate to linear in the case of a high level of collisions, and there is additional space required to build the hash table.

The segmentation approach (n-gram method) is based on the assumption that the target string and candidates should have common substrings. The index is built from substrings of certain length (n-grams) and therefore it is possible to avoid a linear search in most cases and therefore this is faster than a linear search.

The classic spell-checker method is based on the modification of a target word according to known correction rules and performing simple look up in the dictionary. This method is suitable only for closed classes of applications. However, the method does have the advantage of bringing context to the process.

Trie data structures are used to carry out string searches particularly through large texts. The term "trie" stems from the word "retrieval". Trie structures are multi-way tree structures which are useful for storing strings over an alphabet. Trie structures are used to store large dictionaries of words. The alphabet used in a trie structure can be defined for the given application, for example, {0,1} for binary files, {the 256 ASCII characters}, {a, b, c ... x, y, z}, or another form of alphabet such as Unicode, which represents symbols of most word languages.

The concept of a trie data structure is that all strings with a common prefix propagate from a common node. A node has a number of child nodes of, at most, the number of characters in the alphabet and a terminator. The string can be followed from the root to the leaf at which there is a terminator that ends a string. In this way a trie-based dictionary can be built for a lexicon. For example, an English-language dictionary can be stored in this way. A trie-based dictionary has the advantage that the data is compressed due to the common entries for prefixes and possibly postfixes. A method of scanning a trie-based dictionary in order to recover approximate matches is called a trie walker.

IEEE Transactions on Knowledge and Data Engineering August 1996 (Vol. 8, No. 4) pp. 540-547, H. Shang, T. H. Merrett, "Tries for Approximate String Matching" describes a method of approximate string matching based on the usage of a trie-based dictionary. The lexicon of the trie-based dictionary is stored as a finite state machine i.e. along a path in the digital tree or trie as described in Proceedings of the International Symposium on Cooperative Database Systems for Advanced Applications, Kyoto, 1996. World Scientific, 1996. T. H. Merrett, H. Shang, Xiaoyan Zhao: "Database Structures, Based on Tries, for Text, Spatial, and General Data", pp. 507-515.

The computational complexity of approximate string matching is a recurrent problem. The approximate matching procedure is a non-deterministic trie walker with rejects. Its computational complexity for a certain target word depends only on the target word length and the average distribution of the degree of a dictionary graph group, which is not much correlated to the dictionary size for natural languages. Thus, the complexity remains sub-linear to the size of the dictionary in practice for natural languages, i.e. with the growth of dictionary size the number of operations tends to be proportional to the length of the target word rather than the number of dictionary entries.

Approximate string matching in a trie-based dictionary also allows the combination of exact and approximate word matching. These advantages plus the fact that trie indexes contract prefixes and possibly postfixes and thus are compact in storage are the reasons of prevalence for this method of approximate matching.

Along with the advantages stated above, the trie-based method has drawbacks. One of the drawbacks is that it is not possible to use the method in its pure form for certain applications as natively it operates out of context. The only context available is the dictionary lexicon, which is not enough. For example, in order for spell-checkers to provide intelligent suggestion, they should rely on a set of common phonetic errors for a certain language, character similarity during optical character recognition (for example, i and l, cl and d, m and rn), or close layout of certain keys on a keyboard. This form of context is not provided in the known method.

Another example of an improvement provided by bringing the context into the process is the "Did you mean?" functionality of search engines. Suggestion of an alternative query can be found by substituting different fragments of the query with relevant synonyms while performing approximate match in the dictionary of previous queries. Thus context dependent correction rules are needed along with approximate match methods in order to bring context and improve intelligence by better narrowing and ranking of the set of result suggestions.

However, combining the application of text correction rules and practical non-deterministic traversing of the trie is a complicated task which historically has been performed in several passes as described in U.S. Pat. No. 6,616,704.

Another drawback is related to a prevalent practice of storing word fragments along with stand-alone words, particularly, although not exclusively, in applications for natural language processing for languages like German, Dutch, Danish, Swedish, Norwegian, Dutch, Icelandic, Afrikaans, etc. This practice permits the creation of compact dictionaries. A disadvantage to this approach is that the methods of approximate matches for compound words in dictionaries of word fragments do not match exact decompounding methods and require separate implementations.

A further drawback is that the implementation of suggestion gathering depends on the technique used for error value computation. While traversing the dictionary, the trie walker gathers suggestions, which conform to a predefined error tolerance as described in the reference IEEE Transactions on Knowledge and Data Engineering August 1996 (Vol. 8, No. 4) pp. 540-547, H. Shang, T. H. Merrett, "Tries for Approximate String Matching". Paths where the error value exceeds the error tolerance are rejected by the trie walker.

There are two prevalent techniques for error value computation in practice. For natural language applications, the notion of edit distance is used. Edit distance is a minimum number of changes such as replacement, insertion or deletion of one symbol, which have to be made to match two strings. There is one more operation, which has to be considered for spell aid applications—transposition of two symbols. The second prevalent method of error value computation is sequence-oriented. It is based on the calculation of the number of common substrings of fixed length or n-grams. This method is used in areas such as computational biology, in particular in DNA sequence matching as described in reference R. C. Angell, G. E. Freund, and P. Willett, "Automatic spelling correction using a trigram similarity measure", Information Processing and Management, 19:255-261, 1983. Thus, there is an open option for the technique for error value computation in approximate string matching in a trie-based dictionary which is desirable to preserve.

SUMMARY OF THE INVENTION

The aim of the present invention is to provide an approximate string matching method, which inherits the advantages of approximate matching in a trie-based dictionary such as sub-linear computational complexity, combination of exact and approximate matches, dictionary compactness and independency of the method of error value computation, but which also reduces the approximate string matching task to appropriate context and is able to operate against a dictionary of word fragments.

A method of single pass, rule-driven approximate string matching in a trie-based dictionary is described as a lookup process for possibly non-delimited words against a trie-based dictionary of words along with word fragments, which results in a set of suggestions.

The following features are provided by aspects of the present invention which improves the prior technique of approximate string matching using a trie-based dictionary:

1. In order to follow context dependent correction rules during approximate string matching, a target input string has to be modified according to a correction rule if there is a match of the correction rule found at any position in the target string during non-deterministic trie traversing. In such a case, sequence-to-sequence character substitution is done according to the matched rule, and the non-deterministic traversing continues for the modified target as well as for the original target string. No additional modifications of the modified target string are allowed within its already modified parts.

2. In order to operate against a dictionary of word fragments, the prevalent trie walker is looped back to the root node of the dictionary trie if a word fragment gloss node is met and the gathered suggestion is shorter than the input target string.

3. As a supplement to the previous modification, in order to split non-delimited words (i.e. words with no word breaks) the trie walker is looped back to the root node and a word break is inserted into the currently gathered suggestion if a stand-alone word gloss node is met or a compound word is completed and the gathered suggestion is shorter than the target string.

According to a first aspect of the present invention there is provided a method of approximate string matching of a target string to a trie data structure, the trie data structure having a root node and generations of child nodes each node representing at least one character in an alphabet, the method comprising: traversing a trie data structure starting from the root node by comparing each node of a branch of the trie data structure to characters in the target string; adding characters traversed in a branch of the trie data structure to a gathered string; reaching a node flagged as a node for a word or a word fragment and, if the target string is longer than the gathered string, looping back to the root node, and continuing the traverse from the root node.

Preferably, at the step of reaching a node flagged as a node for a word or a word fragment, if the node is flagged as a word and if the target string is longer than the gathered string, the method includes adding a word break to the gathered string before looping back to the root node. However, if the node is flagged as a word fragment and if the target string is longer than the gathered string, the method includes looping back to the root node and continuing to add characters to the gathered string.

The method may also include: at each node, determining if there is a correction rule for one or more characters in the remainder of the target string from the current node; if so, applying the correction rule to the target string to obtain a modified target string. A correction rule may be a sequence to sequence character substitution. If a correction rule is applied, the method may include continuing the traverse for the modified target string as well as for the original target string and no additional modifications of the modified target string may be allowed within its already modified parts.

The method may also include at each node accepting a match for a character by appending the character to a gathered string and incrementing the current character in the target string, or applying an edit operation to a gathered string and incrementing a count of an error value for the approximation. The method may include predefining edit operations to be skipped depending on the edit operations carried out in previous steps of the traverse.

Preferably, the traverse is a single, non-deterministic pass which gathers entries which conform to an error tolerance.

According to a second aspect of the present invention there is provided a system for approximate string matching of a target string to a trie data structure, the system comprising: a trie data structure having a root node and generations of child nodes each node representing at least one character in an alphabet; means for traversing a trie data structure starting from the root node by comparing each node of a branch of the trie data structure to characters in the target string and adding characters traversed in a branch of the trie data structure to a gathered string; means for determining if a node is flagged as a node for a word or a word fragment and means for comparing the length of the target string to the length of the gathered string; means for looping back to the root node when the means for determining determines a node flagged as a node for a word or a word fragment and the means for comparing determines that the target string is longer than the gathered string.

The system may also include means for indicating if a node is a word or a word fragment and, if a word fragment, the position of the word fragment in a word.

The system may include means for providing a set of suggestions from the trie data structure. The system may also include a set of correction rules for applying a sequence to sequence substitution within a target string.

According to a third aspect of the present invention there is provided a computer program product stored on a computer readable storage medium, comprising computer readable program code means for performing the steps of: traversing a trie data structure starting from the root node by comparing each node of a branch of the trie data structure to characters in the target string; adding characters traversed in a branch of the trie data structure to a gathered string; reaching a node flagged as a node for a word or a word fragment and, if the target string is longer than the gathered string, looping back to the root node, and continuing the traverse from the root node.

According to a fourth aspect of the present invention there is provided a method of approximate string matching of a target string to a trie data structure, the trie data structure having a root node and generations of child nodes each node representing a character in an alphabet, the method comprising: traversing a trie data structure starting from a root node by comparing each node of a branch of the trie data structure to characters in the target string; at each node, determining if there is a correction rule for one or more characters in the remainder of the target string from the current node; if so, applying the correction rule to the target string to obtain a modified target string.

A correction rule may be a sequence to sequence character substitution. The method may include continuing the traverse for the modified target string as well as for the original target string and no additional modifications of the modified target string may be allowed within its already modified parts. The correction rules may be stored in the trie data structure or, alternatively, they may be stored in a separate, second data structure.

The method may also include: adding characters traversed in a branch of the trie data structure to a gathered string; reaching a node flagged as a node for a word or a word fragment and, if the target string is longer than the gathered string, looping back to the root node, and continuing the traverse from the root node.

At the step of reaching a node flagged as a node for a word or a word fragment, if the node is flagged as a word and if the target string is longer than the gathered string, the method may include adding a word break to the gathered string before looping back to the root node. However, if the node is flagged as a word fragment and if the target string is longer than the gathered string, the method may include looping back to the root node and continuing to add characters to the gathered string.

The method may include at each node: accepting a match for a character by appending the character to a gathered string and incrementing the current character in the target string; or applying an edit operation to a gathered string and incrementing a count of an error value for the approximation. The method may include predefining edit operations to be skipped depending on the edit operations carried out in previous steps of the traverse.

Preferably, the traverse is a single, non-deterministic pass which gathers entries which conform to an error tolerance.

According to a fifth aspect of the present invention there is provided a system for approximate string matching of a target string to a trie data structure, the system comprising: a trie data structure having a root node and generations of child nodes each node representing at least one character in an alphabet; means for traversing a trie data structure starting from the root node by comparing each node of a branch of the trie data structure to characters in the target string and adding characters traversed in a branch of the trie data structure to a gathered string; and a set of correction rules for applying a sequence to sequence substitution within a target string.

The set of correction rules may be stored in the trie data structure or, alternatively, they may be stored in a separate data structure.

The system may also include: means for determining if a node is flagged as a node for a word or a word fragment and means for comparing the length of the target string to the length of the gathered string; means for looping back to the root node when the means for determining determines a node flagged as a node for a word or a word fragment and the means for comparing determines that the target string is longer than the gathered string. The system may include means for indicating if a node is a word or a word fragment and, if a word fragment, the position of the word fragment in a word.

The system may also include means for providing a set of suggestions from the trie data structure.

According to a sixth aspect of the present invention there is provided a computer program product stored on a computer readable storage medium, comprising computer readable program code means for performing the steps of: traversing a trie data structure starting from a root node by comparing each node of a branch of the trie data structure to characters in the target string; at each node, determining if there is a correction rule for one or more characters in the remainder of the target string from the current node; if so, applying the correction rule to the target string to obtain a modified target string.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENTS

Figure 1:
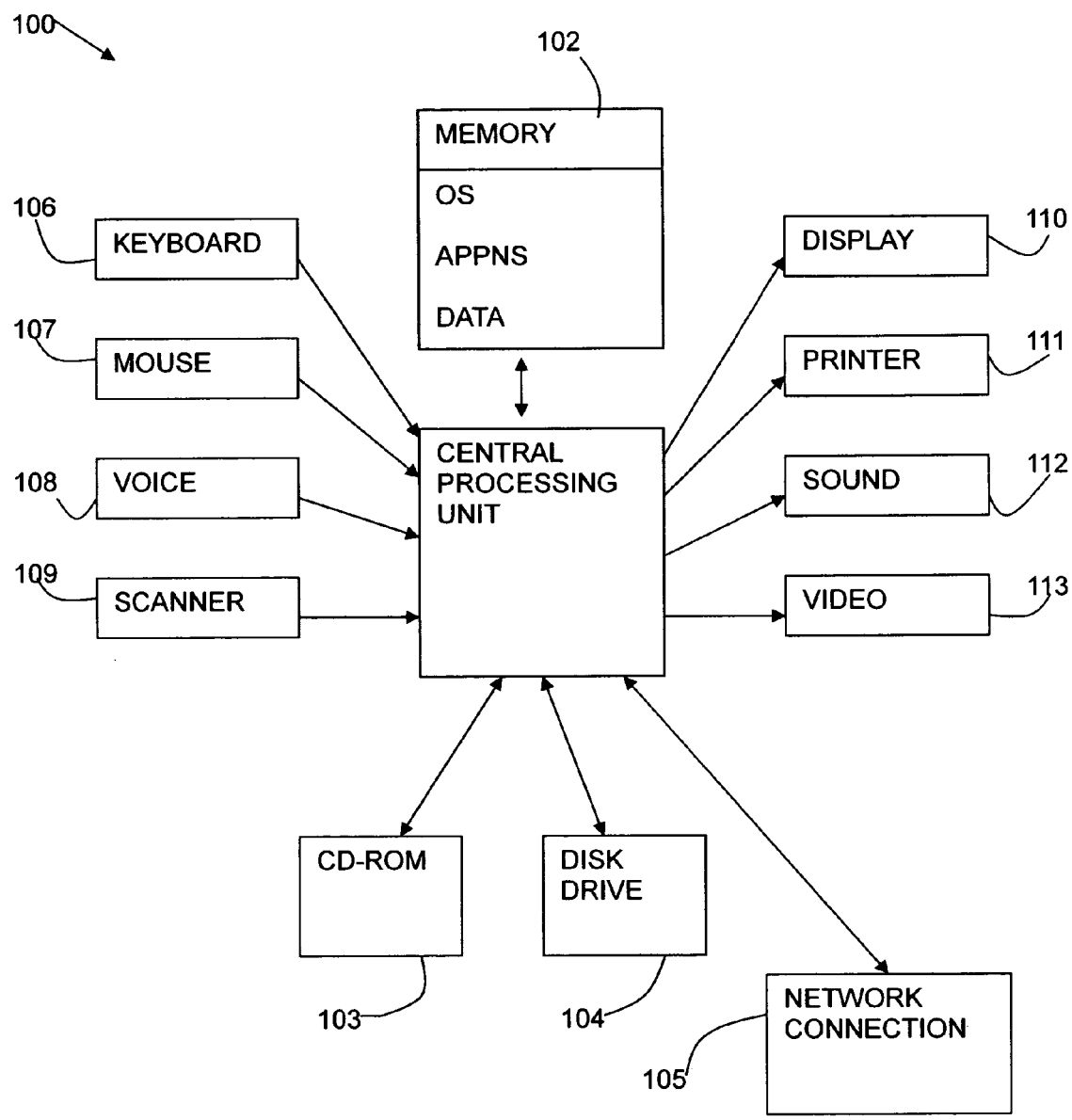
FIG. 1 is a schematic block diagram showing a computer system in accordance with the present invention.

Referring to FIG. 1, a computer system 100 is shown on which the present invention may be implemented. A computer system 100 has a central processing unit 101 with primary storage in the form of memory 102 (RAM and ROM). The memory 102 stores program information and data acted on or created by the programs. The program information includes the operating system code for the computer system 100 and application code for applications running on the computer system 100. Secondary storage includes optical disk storage 103 and magnetic disk storage 104. Data and program information can also be stored and accessed from the secondary storage.

The computer system 100 includes a network connection means 105 for interfacing the computer system 100 to a network such as a local area network (LAN) or the Internet. The computer system 100 may also have other external source communication means such as a fax modem or telephone connection.

The central processing unit 101 includes inputs in the form of, as examples, a keyboard 106, a mouse 107, voice input 108, and a scanner 109 for inputting text, images, graphics or the like. Outputs from the central processing unit 100 may include a display means 110, a printer 111, sound output 112, video output 113, etc.

In a distributed system, a computer system 100 as shown in FIG. 1 may be connected via a network connection 105 to a server on which applications may be run remotely from the central processing unit 101 which is then referred to as a client system.

Applications which may run on the computer systems from a storage means or via a network connection may include word processing programs, Internet access programs including search engines for searching the World Wide Web, other text indexing and retrieving programs for databases, machine translation programs for translating foreign language documents, optical character recognition programs for recognizing characters from scanned documents, etc.

Many of these applications include executable code for carrying out approximate string matching against given resources. For example, a spell checking application carries out approximate string matching of words in a document executed in an application against a resource in the form of a dictionary of words in a chosen language and suggests alternatives to an unrecognized word. As another example, a search engine may include a word recognition application which compares an input word with words in a dictionary and suggests other words which may have been intended for the search input. Approximate string matching is not limited to word analysis and can extend to data base retrieval of recognized references and other applications.

Figure 2:
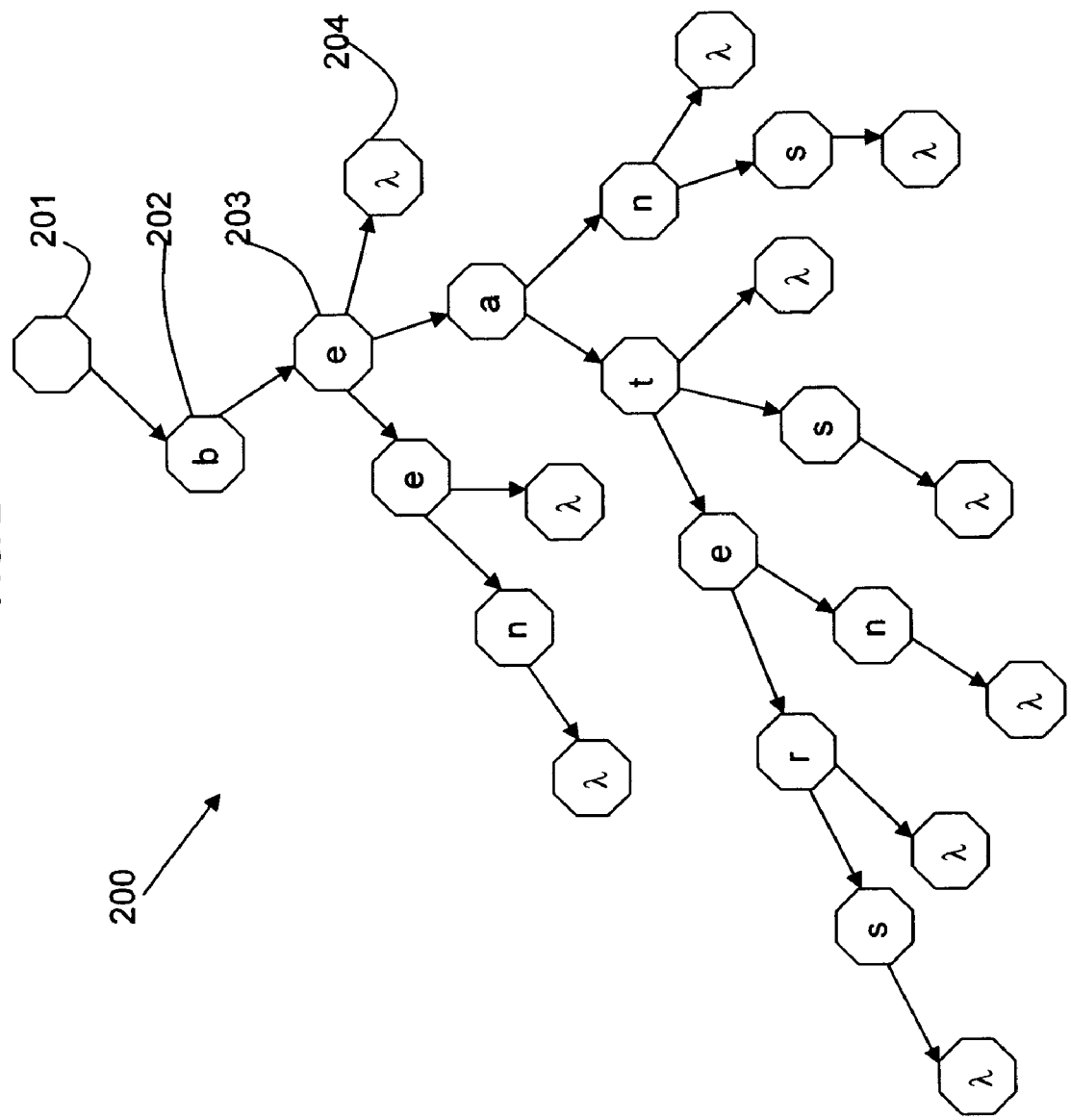
FIG. 2 is an example of an extract of a trie-based dictionary as known in the prior art.

One technique for approximate string matching uses a resource in the form of a trie-based dictionary. Referring to FIG. 2, a trie data structure 200 is shown. The trie data structure 200 is a multi-way tree structure with a root node 201 from which child nodes extend. In turn, each child node can become a parent node with child nodes of its own. The nodes in the trie data structure represent characters in an alphabet and a string of characters is represented by following a route down the trie from the root node 201 to a leaf node 204. Leaf nodes are provided by terminators for a recognized string of characters.

A trie data structure can be used to store a large dictionary of words and parts of words. The alphabet can be defined for the given application, for example, {0,1} for binary files, {the 256 ASCII characters}, {a, b, c ... x, y, z}, or another form of alphabet such as Unicode, which represents symbols of most word languages.

The concept of a trie data structure is that all strings with a common prefix propagate from a common node. When the strings are words in the alphabet {a, b, c ... x, y, z}, a node usually has at most 27 child nodes—one for each letter and a terminator. The alphabet may also include punctuation characters such as an apostrophe or a hyphen in which case a node may have more child nodes. The string can be followed from the root to the leaf that ends a string. A trie-based dictionary has the advantage that the data is compressed due to the common entries for prefixes. A method of scanning a trie-based dictionary in order to recover approximate matches is called a trie walker.

In the example shown in FIG. 2, a trie data structure 200 is shown with a root node 201. The root node 201 will have a maximum number of child nodes for the characters in the alphabet plus a terminator. One path is illustrated in the trie 200 from the child node for the letter "b" 202. The string "be" is a recognized word and therefore a terminator node 204 is a child node from the letter "e" 203. Similarly, the following recognized words are shown in the trie 200: "bee", "been", "bean", "beans", "beat", "beats", "beaten", "beater", "beaters". Where each valid word ends in the trie 200, a terminator node is provided. The terminator node is referred to as a gloss node where the root-to-node path string is a valid dictionary entry.

A trie data structure represents a dictionary of words or recognized sequences of characters to which the approximate string matching technique compares a target string of characters which is the subject of the approximate matching. The target string is compared, one character at a time, to the nodes in a trie starting at the root node.

A traverse refers to a recursive process of constructing a string for every root-to-node path in the trie from an empty string. The traverse adds characters to a gathered string as it progresses through the trie. A trie walker refers to the recursive procedure of dictionary traversing defined above. The master dictionary refers to a dictionary which is subject to traverse.

An error value for the approximation is set to determine how many differences are allowed between the target string and the valid dictionary entries. For example, if the error value is set to 1, only one operation to change a character in the string can be allowed before the route through the trie is rejected.

If a current node in a trie path matches the current node in a target string, the current node in the trie path is appended to the gathered string. If a current node in the trie path does not match the current character in the target string, an edit operation is carried out such as an insertion or a deletion.

The target string must always progress one character forward in the target string, extending it with imaginary non-matching characters if necessary.

This method of target string matching is a non-deterministic trie walker with rejects. While traversing the dictionary the trie walker gathers suggestions, which conform to some predefined error tolerance. Paths whose error value exceeded the error tolerance are rejected by the trie walker. The process is independent from the method of error value computation.

In accordance with an aspect of the present invention, a method is described in which approximate string matching in a trie-based dictionary includes correction rules in the trie data structure. A target string is modified according to a correction rule if there is a match for a correction rule found at a position in the target string during a traverse. A correction rule refers to a pair of character sequences that describe a possible substitution within the target string, for example, substitution of sequence "ph" to "f" is a correction rule reflecting a common phonetic misspelling for natural languages. A sequence-to-sequence character substitution is carried out according to the matched correction rule. The traversing then continues for the modified target string as well as for the original target string. No additional correction rules or other edit operations are allowed within the modified target string.

This provides a deterministic lookup procedure for the remainder of the target string at each trie node from the current position of the trie walker in order to match a correction rule. Each prefix of the remainder of the target string, which matches a correction rule, is substituted by the rule correction pair, and the traversing continues for the original target string and for the modified target strings.

The lookup for correction rules is forbidden within parts of the target string that have already been modified, in order to prevent overlapping of rules. Correction rules can be stored either in the master dictionary or in another dictionary not necessarily having a trie based structure. Applying the modification above forces the trie walker to operate with a modified target string according to the correction rule, thus correction rules are applied in parallel with trie traversing.

Another aspect of the present invention includes a trie-based dictionary with gloss nodes for word fragments as well as for complete words. A method is described which includes looping the trie walker back to the root node if it reaches the gloss node of a word fragment and the current gathered suggestion is shorter than the target string. This forces the trie walker to accept word fragments along with stand-alone words.

Non-delimited words (i.e. two or more words joined with no word breaks) can also be split by looping the trie walker back to the root node and appending a word break symbol to the current gathered suggestion if it reaches the gloss node of a stand-alone word or completes a compound word, and the current gathered suggestion is shorter than the target string. This forces the trie walker to split non-delimited words including compound words.

Edit operations which may be carried out as approximations in a traverse in accordance with an embodiment of the method of the present invention are as follows:

Accept a non-matching character in a gathered string, but do not move to the child node.—This results in an insertion of a missing character in the gathered string compared to the target string.

Accept a non-matching character in a gathered string and continue from the following node.—This results in a substitution of a character in the gathered string compared to the target string.

Do not accept a non-matching character and continue from the following node.—This results in a deletion of a character in the gathered string compared to the target string.

Two consecutive symmetric substitutions.—This results in a transposition of characters in a gathered string compared to the target string.

In addition, a specific performance improving technique is described in which certain edit operations are conditionally skipped depending on certain operations during the previous steps. These operations are shown in the following table:

|  | insertion | Substitution | deletion | Transposition |
| --- | --- | --- | --- | --- |
| insertion |  |  | skip | skip |
| substitution | skip |  |  |  |
| Deletion | skip | Skip |  | skip |
| transposition |  |  |  | skip |
| Match |  |  |  | skip |
| White space |  |  |  | skip |

In the table, the rows are currently performed operations and the columns show marked operations forbidden for the next step. The reason is that one and the same result can be achieved by different sequences of operations, for example, "insertion+deletion"="substitution", and "substitution+deletion"="deletion+substitution". Preventing these extraneous operations from happening significantly reduces the amount of operations.

The described method is reducible to the prior known technique of approximate string matching in a trie-based dictionary by transformation of polynomial complexity $O(r^q)$ where r is a number of correction rules and q is the maximum word length for a certain lexicon. Thus, the complexity of the described method is congruent to the complexity of the known method of approximate string matching using a trie-based dictionary. The method remains sub-linear in practice where the number of correction rules is substantially smaller than the number of entries in the master dictionary. The method remains independent of the method for error value computation.

Figure 3:
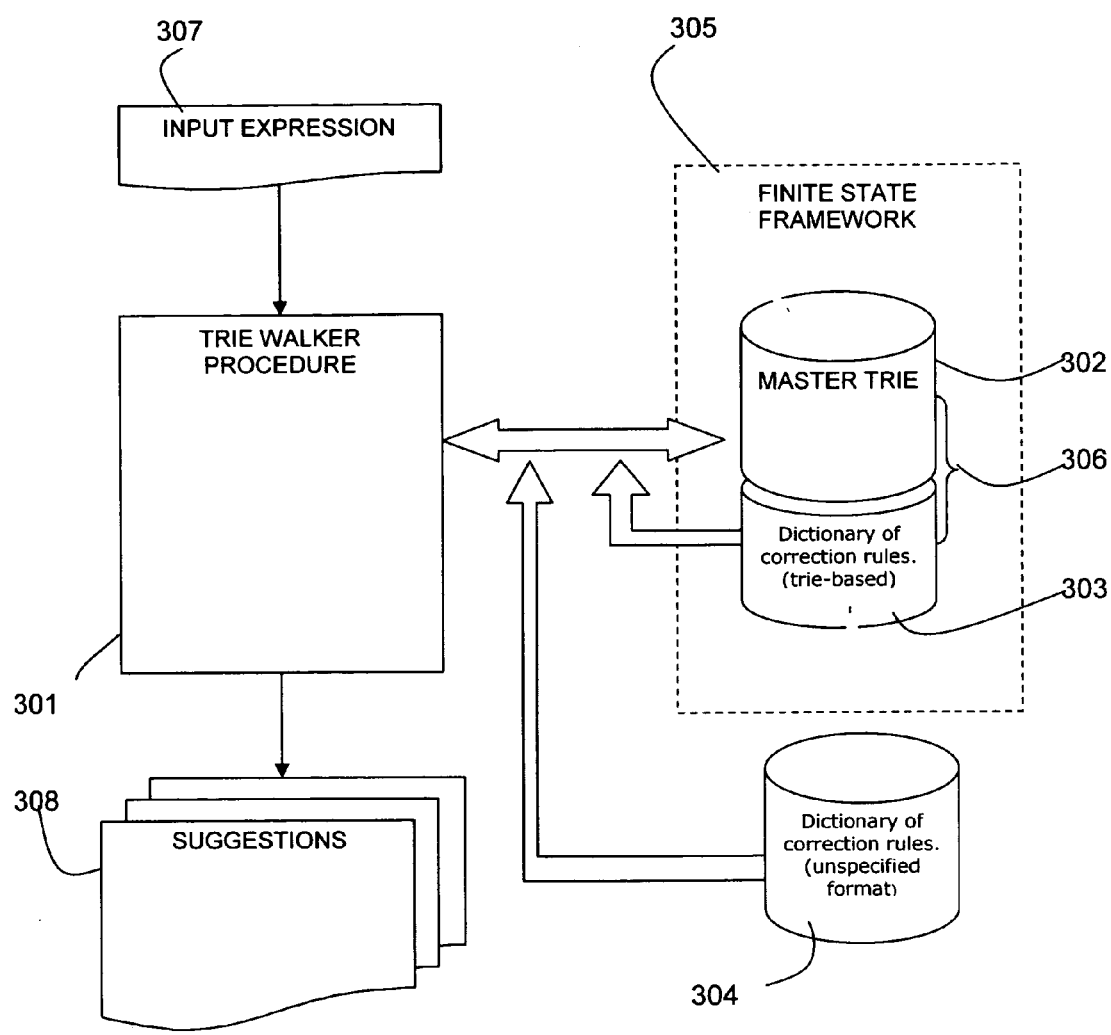
FIG. 3 is a schematic block diagram of an implementation in accordance with the present invention.

Referring to FIG. 3, a schematic block diagram of the system components embodying an example of the described system is provided. A trie walker procedure 301 is a process that implements a non-deterministic trie walker with rejects. The procedure 301 performs a single non-deterministic traverse of a specified master trie 302 and gathers entries which conform to a predefined error tolerance. The procedure 301 also applies correction rules from a specified dictionary of correction rules 303, 304.

The master trie 302 is defined in a finite state framework 305 and is a trie-based dictionary which presents a lexicon, which can be infinite. Correction rules can be trie-based in the form of a dictionary of correction rules 303 which may be merged with the master trie 302 to form a merged trie-based dictionary 306. Alternatively, the correction rules can have an unspecified format 304 and a simple lookup interface can be used for the correction rules.

An input expression 307 is provided to the trie walker procedure 301 and the trie walker procedure 301 carries out a traverse of the master trie 302 and gathers entries which conform to the input expression 307 with a predefined error tolerance. The input expression 307 may or may not belong to the lexicon of the master trie 302. The gathered entries are output as a set of suggestions 308 from the master trie 302. Each suggestion 308 can be a stand-alone word, a compound word, or a multi-word expression.

The finite state framework 305 provides the functionality needed to operate with trie-based dictionaries. The following application programming interfaces are essential for dictionary operation:

Dictionary creation. This creates new blank trie map.

Dictionary activation. This loads a trie map and associated glosses into the memory.

Dictionary deactivation. This unloads an activated dictionary.

Add entry. This adds an entry with associated gloss data.

Dictionary contraction. This performs postfix contraction of the dictionary.

Save dictionary. This saves a newly created or modified dictionary on disk.

Merge dictionary. This merges two dictionary tries and associated gloss data into one trie-based dictionary. This can be used to merge master lexicons and correction rules. A contracted dictionary can be merged into a blank dictionary and the resultant dictionary uncontracted.

The following application programming interfaces are essential for approximate matching functionality:

Simple lookup. This is a lookup for data associated to a string, for example, used for correction rules.

Node traversing interface. This provides the ability to traverse trie nodes using their transition tables and is essential for the trie-walker routine. The node traversing interface is presented by functions which allow transition to the following node by certain character, and lists the characters in the transition table.

The following two application programming interfaces are not finite state framework related but essential for the implementation of the method:

Error tolerance establisher. This establishes individual error tolerance for input expressions. In most cases error tolerance is related to the length of the input expression. The error accumulated by the trie walker in the process of traversing is passed to the reject procedure.

Reject procedure. This makes a decision as to whether a certain route should be rejected by comparing the actual error value with the error tolerance.

A pseudo code listing is shown below which also describes this gathering technique.

Get target string;
Set current node to root node of the trie;
Set gathered string to empty string;
Set current position within the target string to zero;
Set restriction count to zero;
Set error value to zero;
WALKER (target, current node, current position, gathered string, restriction count, error value)

```
{
    FOR (every child node of current node)
    {
    //modifications of prior technique start here
    IF (node is a word fragment gloss)
    THEN    IF(gathered string shorter than target string)
            THEN WALKER( target, root node, current position,
            gathered
                        string, restriction count, error
                        value);
            ELSE PRINT gathered suggestion;
    IF (node is a standalone word gloss)
    THEN    IF(gathered string shorter than target string)
            THEN WALKER( target, root node, current position,
            gathered
                        string+word break, restriction
                        count, error value);
            ELSE PRINT gathered suggestion;
    IF(restriction count equals to zero) //i.e. rules are
    not forbidden
    THEN
    {
        do lookup in order to match all substrings for target
        string from current
        position against dictionary of correction rules;
        FOR(all matched substrings)
        {
            create new target as a copy of target;
            substitute the matched sequence within the new
            target by its
            correction pair;
            WALKER( new target, current node, current position,
            gathered
                        string, length of pasted correction,
                        error value+1);
        }
    }
    decrement restriction count if restriction count is not zero;
    //prior technique follows
    IF (latest transition character does not match character of
    target at the current
position)
    THEN fix error within gathered string according to trie;
        WALKER( target, next node, current position+1,
        fixed gathered string,
                    restriction count, error value+1);
    ELSE append character to so-far gathering string;
```

```
            WALKER( target, next node, current position+1,
            gathered string,
                    restriction count, error value);
    }
}
```

Figure 4A:
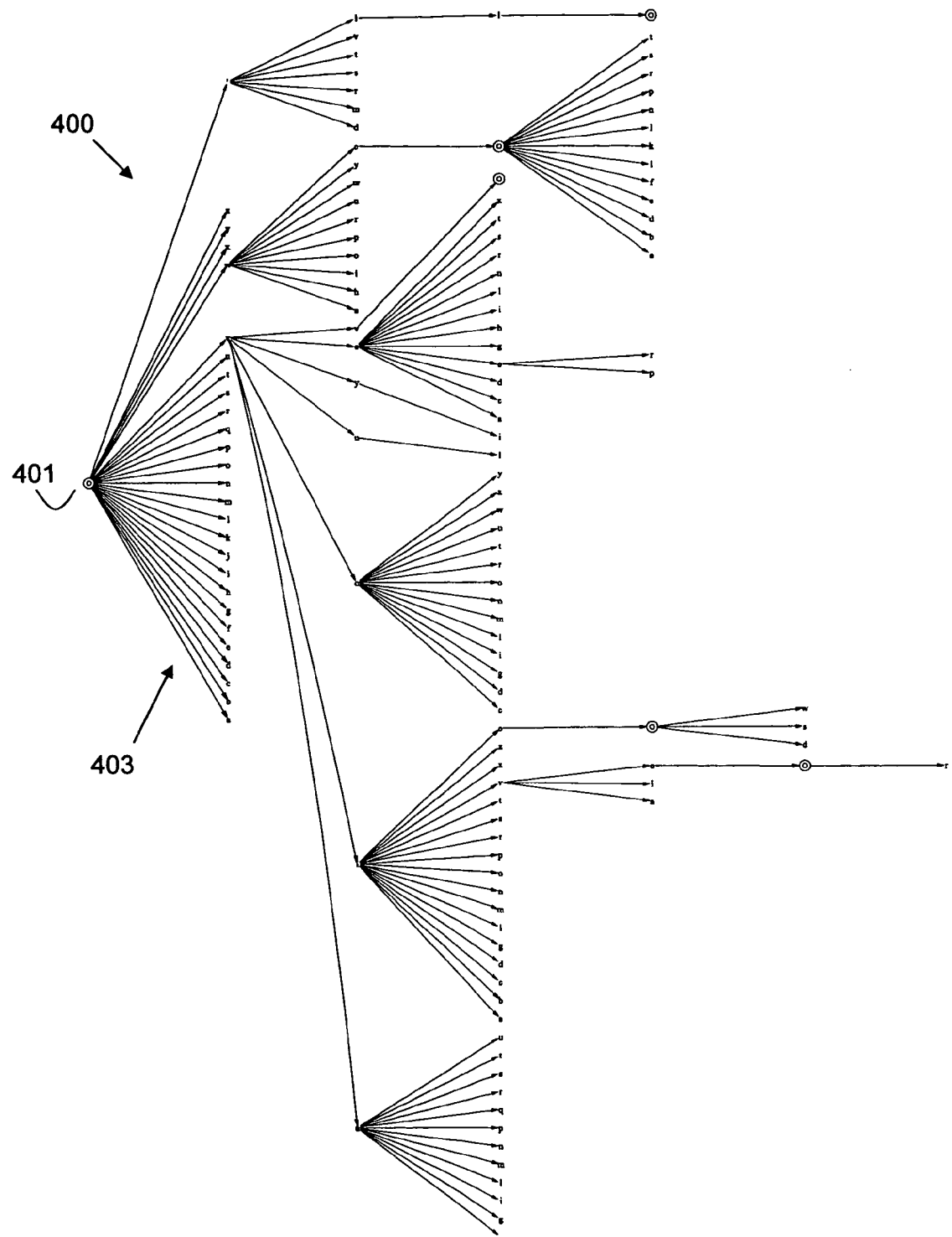
FIG. 4A is an extract of a trie-based dictionary in accordance with the present invention.
Figure 4B:
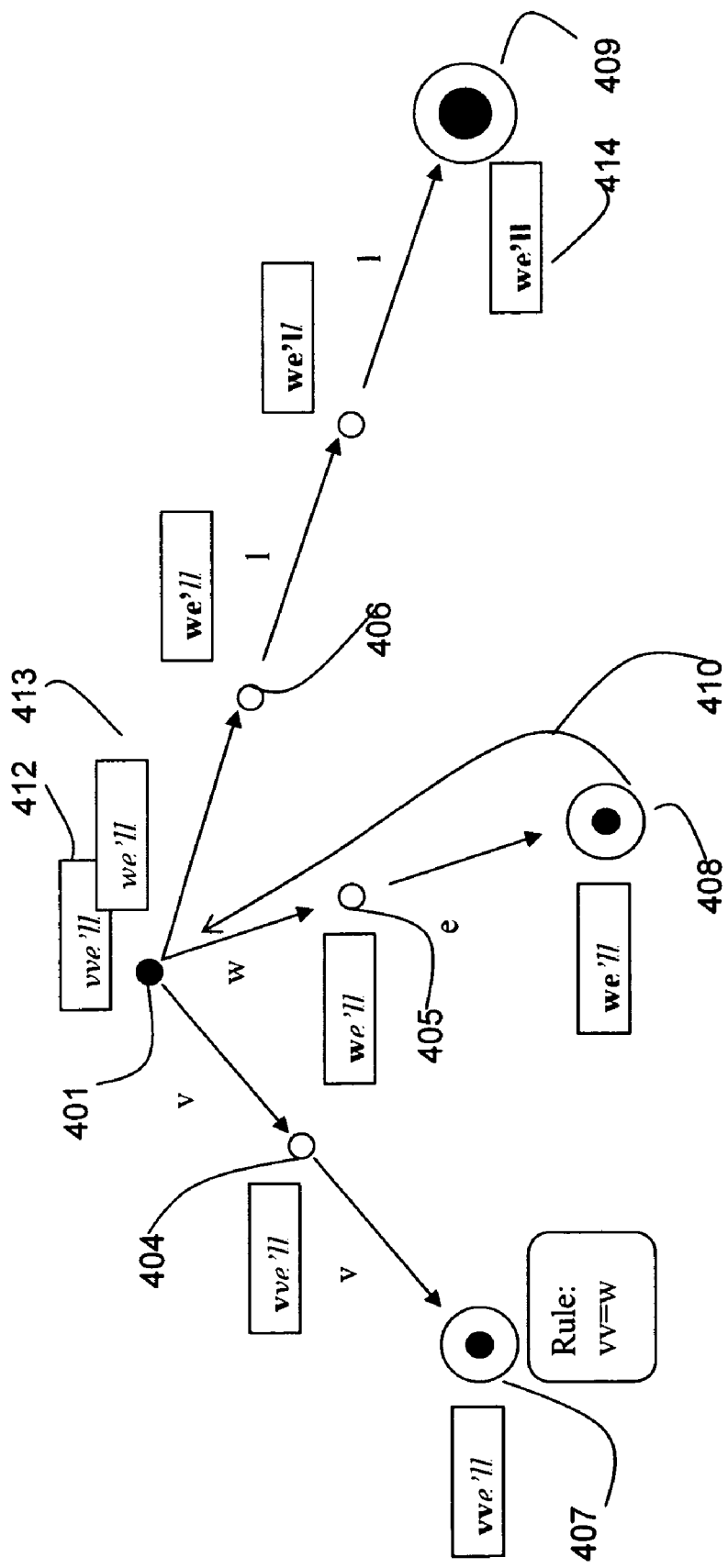
FIG. 4B is a detail of the trie-based dictionary of FIG. 4A showing an example traverse.

FIGS. 4A and 4B show part of an English dictionary trie map and is used to illustrate the operation of the method and system in accordance with the present invention. The map shows trie nodes (vertices), which were visited by the trie walker for the target string "vve'll" in order to gather suggestions for its correct spelling. For the purpose of this description, characters associated with each transition (edge) are placed within its entry node (vertex). Gloss nodes (terminal states) are shown as double circle points on the map.

Referring to FIG. 4A, a part of the English dictionary trie map 400 shows the trie node visited by the trie walker in an attempt to gather suggestions for a misspelt target string "vve'll". The shown dictionary contains word fragments along with standalone words. Words and word fragments are stored along the path from the root node 401 to gloss nodes.

In practice, gloss nodes contain references to data blocks associated with the word or word fragment. The data blocks can contain position codes for the word fragment such as: stand-alone word; beginning of word, middle of word, or end of word code; part of speech; and other data. The information contained in the data blocks conforms to the context in which the dictionary is used. In respect to approximate matching, such information is not essential, but can be used to improve the quality of gathered suggestions. For example, position codes and part of speech information is used to fix overproduction while forming compound words from word fragments observing that certain fragments can not be placed at a certain position within a word according to their position codes. The inclusion of such information is optional and therefore the gathering process is illustrated assuming that the only information in gloss nodes is a flag indicating whether a word is a stand-alone word or a word fragment.

Correction rules are stored in the same dictionary shown in FIG. 4A, which is space efficient due to trie prefix contraction.

For the given example we will calculate the error value as edit distance. The error tolerance is set to 1 for this particular target word; this means that only one error is allowed. The likelihood of having more than one mistake by a typist or optical character recognition routine is low in this example due to the short length of the target word.

Following the method, the trie walker walks by recursively moving to every child of its current node or continuing with the current node, starting from the root node, and conditionally accepting transition characters into a gathered string. Along with this, the trie walker moves character-wise within the target string. If the current character in the target string is equal to the latest transition character on the current trie path, the trie walker appends the character to the gathered string. If the current character in the target string is not equal to the latest character on the current path, the trie walker fixes the error by performing certain edit operations over the gathered string and increments the error value (edit distance) for the current path. The edit operations are: accepting a non-matching character from the trie and not moving to the child node which means insertion of a missed character; accepting of non-matching character from the trie and continuing of traverse from the following node means substitution of a character; not accepting a non-matching character and not moving to the child node means deletion of a mistakenly pasted character; and two consecutive symmetric substitutions are considered as one transposition. The trie walker proceeds with all the options above, always moving one character forward in the target string, extending it with imaginary non-matching characters if necessary. The options that exceed error tolerance are rejected.

Referring to FIG. 4A, the first level 403 of the trie map contains all letters of the English alphabet plus apostrophe. The paths at the first level 403 are dropped by the walker except for characters "v" 404, "w" 405 and "'" 406 as shown in FIG. 4B. That means that the trie walker made an attempt to fix the error for the first character by substitution, insertion and deletion. After that the walker continues walking along those paths but all the following characters do not match either, therefore the edit distance would be beyond the predefined tolerance of 1.

Along with conditional acceptance of characters from the trie, the trie walker performs lookup in order to match all valid prefixes of the remainder of the target string in the dictionary of correction rules. In this embodiment this is provided in the same dictionary.

At the root node 401, the remainder of the target string is equal to the whole target string. There is one matching prefix "vv" in the dictionary, its gloss 407 contains the substitution for the sequence "vv", which might be an incorrect optical recognition of the letter "w". The trie walker performs substitution of the sequence "vv" with the letter "w" incrementing the edit distance for the new string. From this point, the trie walker continues traversing for two target strings: original "vve'll" 412 and aligned by correction rule string "we'll" 413, the latter is disabled for correction lookups that include the letter "w" (i.e. until the remainder is "e'll").

The dictionary does not contain the word "we'll", but does contain the pronoun "we", which is marked at gloss 408 as both a stand-alone word and a word fragment. Accordingly, "'ll" string is stored and marked as a word fragment at gloss 409. Thus, the dictionary allows matching of compound words such as "we'll" or "we'd" or "we're" and so on.

Referring to FIG. 4B, as the trie walker meets a word fragment at gloss 408 and target string 413 is longer than the gathered string ("we"), the trie walker is looped back 410 to the root node 401. It continues traversing "'ll": as the edit distance equals 1 after applying the correction rule, the rest of the paths are ignored. The ultimate gathered string is the compound word "we'll" 414, which is the result of application of correction rules and looping of the trie walker. It also fits into the error tolerance limit.

In the case of the absence of the "vv" to "w" correction rule, the edit distance required to match the desirable "we'll" would be equal to 2—one deletion and one substitution (or vice versa) would have to be made, which is beyond the error tolerance and therefore no suggestions would be gathered. In the case where the error tolerance is set to a bigger value, though, there will be more unlikely suggestions presented, i.e. the set of gathered suggestions will have worse quality compared to one with lesser tolerance.

Figure 5:
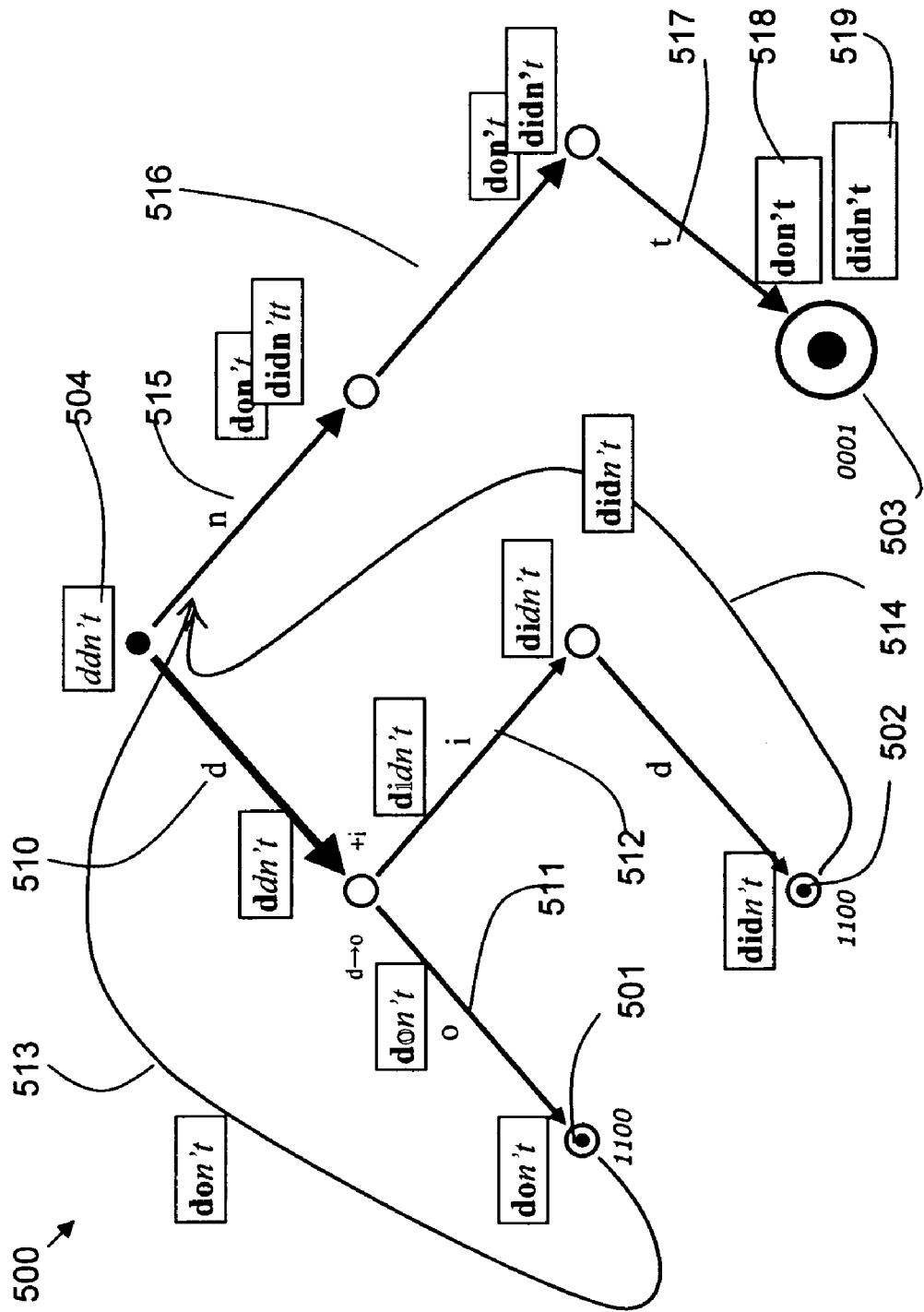
FIG. 5 is a detail of a trie-based dictionary providing another example of a traverse.

Referring to FIG. 5, a further example of an approximate string matching traverse is shown. A fragment (or small stand-alone) trie-based dictionary 500 is shown and presents a practical example of the looping back technique with more manifold positional codes (not just a flag indicating whether a word is a stand-alone word or just a word fragment).

The shown dictionary 500 contains three entries: "do" 501, "did" 502, "n't" 503. A position code table relating to this dictionary 500 is shown below:

| Position within a word | Active bit |
|---|---|
| Stand-alone word | x000 |
| Beginning of word | 0x00 |
| Middle of word | 00x0 |
| End of word | 000x |

According to this table, entries "do" and "did" in the dictionary 500 have position codes "1100" which indicates that they can exist as stand-alone words and also as beginnings of words. Entry "n't" has a position code "0001" which indicates that it presents an ending word fragment.

For the given example, the error value is calculated as edit distance. The error tolerance is set to 1 for target word "ddn't" 504.

After the first letter 'd' is successfully matched 510 (shown by the thick arrow), no continuation is available in the trie for the word "ddn't". Two modified strings are created, one by replacing the second letter 'd' with an 'o' 511, and the other one by inserting an 'i' 512, both carrying error value of 1. The traverse continues for both variants until they reach terminal states for "do" 501 and "did" 502 respectively. Full match is not achieved there, though, and the traverse loops 513, 514 and continues from the beginning, according to the position codes.

Both variants successfully match the letters 'n' 515, "'" 516 and "t" 517 to form the ending part "n't" 503. The two variants "don't" 518, "didn't" 519 are accepted in the final state as the position code allows it. The two suggestions of "don't" and "didn't" are also accepted by error value.

The described method preserves such advantages of approximate matching in trie-based dictionary as sub-linear computational complexity, combination of exact and approximate matches, dictionary compactness and independency of the method of error value computation. The described method concordantly reduces the approximate matching to appropriate context, allows it to operate against a dictionary of word fragments, and in addition permits the splitting of non-delimited words. The method performs the matching in one non-deterministic traverse pass of the dictionary trie. The method achieves the quality of suggestions provided by superposition of several different methods in a single fast technique. Extra tasks are solved which are common for practical applications with one traverse of the trie dictionary, allowing exact and approximate matches to be combined.

The described method also has the following advantages. The preserved sub-linear complexity permits usage of this method on the server side. Also, the preserved ability to combine exact dictionary lookup and approximate matching procedure is beneficial. For example, search engine can perform approximate index lookup using single procedure, avoiding exact index lookup. There are highly flexible languages like Finnish, Hungarian, Turkish, etc. for which a dictionary of words cannot currently be built. The proposed method can be used for these languages using a dictionary of fragments. The ability to operate against non-delimited sequences can be used to perform segmentation in parallel with error fixing.

The method remains independent of the technique of error value computation. This makes it possible for the method to be used in areas separate from text analysis. For example, if a number of common sequences is used as criteria for rejects, the method can be applied for approximate DNA matching, etc.

The present invention is typically implemented as a computer program product, comprising a set of program instructions for controlling a computer or similar device. These instructions can be supplied preloaded into a system or recorded on a storage medium such as a CD-ROM, or made available for downloading over a network such as the Internet or a mobile telephone network.

Improvements and modifications can be made to the foregoing without departing from the scope of the present invention.

We claim:

1. A method of approximate string matching of a target string to a trie data structure, the trie data structure having a root node and generations of child nodes each node representing at least one character in an alphabet, the method comprising:
   traversing a trie data structure starting from the root node by comparing each node of a branch of the trie data structure to characters in the target string;
   determining, at each node, if there is a correction rule for one or more characters in the remainder of the target string from the current node, and, if so, applying the correction rule to the target string to modify the target string to obtain a modified target string, wherein applying the correction rule includes performing a sequence to sequence character substitution on the target string to obtain the modified target string, and continuing to traverse the trie data structure from the current node for both the modified target string and the original target string, wherein no additional modifications of the modified target string are allowed within its modified parts;
   adding characters traversed in a branch of the trie data structure to a gathered string;
   reaching a node flagged as a node for a word or a word fragment, comparing the length of the target string to the length of the gathered string, and, if the target string is longer than the gathered string, looping back to the root node, and continuing the traverse from the root node; and
   providing at least one suggestion from the trie data structure.

2. A method as claimed in claim 1, wherein at the step of reaching a node flagged as a node for a word or a word fragment, if the node is flagged as a word and if the target string is longer than the gathered string, the method includes adding a word break to the gathered string before looping back to the root node.

3. A method as claimed in claim 1, wherein at the step of reaching a node flagged as a node for a word or a word fragment, if the node is flagged as a word fragment and if the target string is longer than the gathered string, the method includes looping back to the root node and continuing to add characters to the gathered string.

4. A method as claimed in claim 1, wherein the method includes at each node:
   accepting a match for a character by appending the character to a gathered string and incrementing the current character in the target string; or
   applying an edit operation to a gathered string and incrementing a count of an error value for the approximation.

5. A method as claimed in claim 4, wherein the method includes predefining edit operations to be skipped depending on the edit operations carried out in previous steps of the traverse.

6. A method as claimed in claim 1, wherein the traverse is a single, non-deterministic pass which gathers entries which conform to an error tolerance.

7. A method as claimed in claim 1, wherein the correction rules is stored in the trie data structure.

8. A method as claimed in claim 1, wherein the correction rule is stored in a separate data structure.

9. A system including at least one processor and a memory storing program code for execution on the processor for approximate string matching of a target string to a trie data structure, comprising:
   a trie data structure stored in said memory and having a root node and generations of child nodes each node representing at least one character in an alphabet;
   program code for traversing a trie data structure starting from the root node by comparing each node of a branch of the trie data structure to characters in the target string and adding characters traversed in a branch of the trie data structure to a gathered string;
   program code for determining, at each node, if there is a correction rule for one or more characters in the remainder of the target string from the current node, and, if so, applying the correction rule to the target string to modify the target string to obtain a modified target string, wherein applying the correction rule includes performing a sequence to sequence character substitution on the target string to obtain the modified target string, for continuing to traverse the trie data structure from the current node for both the modified target string and the original target string, and wherein no additional modifications of the modified target string are allowed within its modified parts;
   program code for determining if a node is flagged as a node for a word or a word fragment and for comparing the length of the target string to the length of the gathered string;
   program code for looping back to the root node when a node is flagged as a node for a word or a word fragment and the target string is longer than the gathered string; and
   program code for providing at least one suggestion from the trie data structure.

10. A system as claimed in claim 9, wherein the program code includes program code for indicating if a node is a word or a word fragment and, if a word fragment, the position of the word fragment in a word.

11. A computer program product stored on a computer readable storage medium, comprising program code for performing the steps of:
   traversing a trie data structure, the trie data structure having a root node and generations of child nodes each node representing at least one character in an alphabet, starting from the root node by comparing each node of a branch of the trie data structure to characters in the target string;
   determining, at each node, if there is a correction rule for one or more characters in the remainder of the target string from the current node, and, if so, applying the correction rule to the target string to modify the target string to obtain a modified target string, wherein applying the correction rule includes performing a sequence to sequence character substitution on the target string to obtain the modified target string, and continuing to traverse the trie data structure from the current node for both the modified target string and the original target string, wherein no additional modifications of the modified target string are allowed within its modified parts;
   adding characters traversed in a branch of the trie data structure to a gathered string;

reaching a node flagged as a node for a word or a word fragment, comparing the length of the target string to the length of the gathered string, and, if the target string is longer than the gathered string, looping back to the root node, and continuing the traverse from the root node; and providing at least one suggestion from the trie data structure.

12. A system as claimed in claim 9, wherein the correction rule is stored in the trie data structure.

13. A system as claimed in claim 9, wherein the correction rule is stored in a separate data structure.

14. A system as claimed in claim 9, further comprising program code for providing a set of suggestions from the trie data structure.

15. A system as claimed in claim 9, further comprising program code for indicating if a node is a word or a word fragment and, if a word fragment, the position of the word fragment in a word.

* * * * *